(12) United States Patent
Frenkel et al.

(10) Patent No.: US 12,020,711 B2
(45) Date of Patent: Jun. 25, 2024

(54) SYSTEM AND METHOD FOR DETECTING FRAUDSTERS

(71) Applicant: Nice Ltd., Ra'anana (IL)

(72) Inventors: Roman Frenkel, Ashdod (IL); Yarden Hazut, Herzliya (IL); Rotem Shuster Radashkevich, Tel Aviv (IL)

(73) Assignee: Nice Ltd., Ra'anana (IL)

(*) Notice: Subject to any disclaimer, the term of this patent is extended or adjusted under 35 U.S.C. 154(b) by 62 days.

(21) Appl. No.: 17/166,525

(22) Filed: Feb. 3, 2021

(65) Prior Publication Data

US 2022/0246153 A1    Aug. 4, 2022

(51) Int. Cl.
  *G10L 17/18*   (2013.01)
  *G06Q 50/26*   (2012.01)
  *G10L 15/22*   (2006.01)
  *G10L 17/04*   (2013.01)
  *G10L 17/08*   (2013.01)

(52) U.S. Cl.
  CPC .............. *G10L 17/08* (2013.01); *G06Q 50/26* (2013.01); *G10L 15/22* (2013.01); *G10L 17/04* (2013.01)

(58) Field of Classification Search
  CPC ......... G06F 21/32; G10L 17/00; G10L 17/06; G10L 17/04
  See application file for complete search history.

(56) References Cited

U.S. PATENT DOCUMENTS

| 9,237,232 | B1* | 1/2016 | Williams ................. G10L 17/06 |
| 10,110,738 | B1 | 10/2018 | Sawant et al. |
| 10,659,588 | B1* | 5/2020 | Guan ..................... H04M 3/385 |
| 10,911,600 | B1* | 2/2021 | Frenkel ................... G10L 17/08 |
| 11,039,012 | B2 | 6/2021 | Michaeli et al. |
| 2004/0249650 | A1 | 10/2004 | Freedman et al. |
| 2011/0206198 | A1 | 8/2011 | Freedman et al. |
| 2012/0072453 | A1* | 3/2012 | Guerra ................ H04M 3/2281 707/E17.014 |
| 2013/0216029 | A1 | 8/2013 | Pawlewski |
| 2015/0055763 | A1 | 2/2015 | Guerra et al. |
| 2015/0142446 | A1 | 5/2015 | Gopinahan et al. |
| 2015/0269941 | A1 | 9/2015 | Jones |
| 2015/0281446 | A1 | 10/2015 | Milstein et al. |
| 2017/0061968 | A1* | 3/2017 | Dalmasso ............... G10L 17/08 |
| 2017/0221488 | A1* | 8/2017 | Xiong ..................... G10L 17/02 |
| 2018/0032755 | A1 | 2/2018 | Odinak |
| 2018/0082689 | A1 | 3/2018 | Khoury et al. |
| 2019/0037081 | A1 | 1/2019 | Rao et al. |
| 2019/0104120 | A1* | 4/2019 | Arrowood ............... G06F 21/32 |
| 2019/0362017 | A1* | 11/2019 | Salomon ............... G06F 16/285 |

(Continued)

*Primary Examiner* — Mark Villena
(74) *Attorney, Agent, or Firm* — PEARL COHEN ZEDEK LATZER BARATZ LLP (57) ABSTRACT

A system and method may classify a plurality of interactions, by: obtaining a plurality of voiceprints of the plurality of interactions, wherein each voiceprint of the plurality of voiceprints represents a speaker participating in an interaction of the plurality of interactions; calculating, for each interaction, a plurality of scores, wherein each score of the plurality of scores is indicative of a similarity between the voiceprint of the interaction and one voiceprint of a set of benchmark voiceprints; calculating, for each interaction, statistics of the scores; and determining that a plurality of interactions pertain to a single cluster of interactions based on statistics of the scores of the interactions in the cluster.

18 Claims, 4 Drawing Sheets

(56) References Cited

U.S. PATENT DOCUMENTS

| | | |
|---|---|---|
| 2019/0373105 A1 | 12/2019 | Kung et al. |
| 2020/0184979 A1 | 6/2020 | Keret et al. |
| 2020/0382608 A1* | 12/2020 | Srinivasa Ragavan ................... H04L 67/63 |
| 2020/0404094 A1* | 12/2020 | Roderick ................ G10L 17/04 |
| 2020/0411013 A1* | 12/2020 | Horton ................ H04M 3/2281 |
| 2021/0037136 A1 | 2/2021 | Michaeli et al. |
| 2021/0112163 A1 | 4/2021 | Frenkel et al. |
| 2022/0116388 A1* | 4/2022 | Johnson ................. G10L 25/72 |

* cited by examiner

SYSTEM AND METHOD FOR DETECTING FRAUDSTERS

FIELD OF THE INVENTION

The present invention relates generally to fraud detection technology, and more specifically, to technology for detecting fraud attempts against a contact center or other entity.

BACKGROUND OF THE INVENTION

Some organizations, and specifically those which operate call centers, may aim to detect fraudsters using voice biometrics technology, as well as other factors. Biometrics technology may use voice features of speakers (those speakers being other than the agent at the call center) to identify known and new fraudsters. A voiceprint of a speaker part of an interaction may be generated and stored along with other metadata of identified speakers. Thus, a claimed identity of a speaker in an interaction may be verified automatically within the first few seconds of a call through natural conversation with an agent in the call center. Some organizations may store voiceprints of known fraudsters in a watchlist, thus known fraudsters (e.g., fraudsters whose voiceprints are included in the watchlist) may be easily identified by comparing a speaker voiceprint to voiceprints in the watchlist.

Detecting new or unknown fraudsters may be a larger challenge. Technology exists to detect fraudsters by clustering calls or interactions based on the fraudster's voice, with the underlying assumption that a fraudster would call many more times than an honest speaker. However, the complexity of current algorithms is typically very high, which prevents those algorithms from being scalable, e.g., support an increasing number of calls using the same computer resources.

SUMMARY OF THE INVENTION

A computer-based system and method for classifying a plurality of interactions may include: obtaining a plurality of voiceprints of the plurality of interactions, wherein each voiceprint of the plurality of voiceprints represents a speaker participating in an interaction of the plurality of interactions; calculating, for each interaction, a plurality of scores, wherein each score of the plurality of scores is indicative of a similarity between the voiceprint of the interaction and one voiceprint of a set of benchmark voiceprints; calculating, for each interaction, statistics of the scores; and determining that a plurality of interactions pertain to a single cluster of interactions based on statistics of the scores of the interactions in the cluster.

According to some embodiments, the benchmark voiceprints may be selected from the plurality of voiceprints.

According to some embodiments, determining that a plurality of interactions pertain to a single cluster of interactions may include: finding candidate pairs of interactions based on similarity in the statistics of the scores of each interaction in the candidate pair; for each candidate pair, calculating a pair threshold, based on the statistics of the scores of the candidate pair; calculating a pair score indicative of a similarity between the voiceprints associated with the interactions of the pair; and determining that the pair pertain to a single cluster of interactions if the pair score is above the pair threshold.

According to some embodiments, finding the candidate pairs of interactions may include: calculating similarity between the statistics of the scores; and finding pairs for which the similarity is above a similarity threshold.

According to some embodiments, calculating statistics of the scores may include calculating means and standard deviations, and finding the candidate pairs of interactions may include finding pairs of interactions for which the difference between the mean associated with each interaction is below a second threshold and the difference between the standard deviation associated with each interaction is below a third threshold.

According to some embodiments, calculating the pair threshold may include finding, based on the statistics of the scores of the candidate pair, a value that is above a majority of the scores of the interactions of the pair.

According to some embodiments, calculating the pair threshold may include finding the maximum between the mean plus Z times the standard deviation of the scores of each interaction of the pair, wherein Z is a number equal or larger than two.

Embodiments of the invention may include clustering the interactions based on the pairs that pertain to a single cluster.

Embodiments of the invention may include clustering the interactions based on the pair that pertain to a single cluster by traversing the pairs that pertain to a single cluster; and for each pair: if none of the interactions in the pair already pertain to a cluster, assigning the interactions in the pair to a new cluster, if a first interaction in the pair pertains to a cluster and a second interaction in the pair does not pertain to a cluster, assigning the second interaction to the same cluster as the first interaction; and if a first interaction in the pair pertains to a first cluster and a second interaction in the pair pertains to a second cluster, unifying the first cluster and the second cluster into a single cluster.

According to some embodiments, calculating statistics of the scores may include calculating means and standard deviations.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Technology exists to detect new or unknown fraudsters by clustering calls or interactions based on the speaker's voice (the speaker being other than the agent at a call center). However, prior art technology clusters speakers by comparing voiceprints of each speaker against voiceprints of all other speakers. Thus, for a set of N interactions, $$\frac{N(N-1)}{2}$$

comparisons may be required, and the complexity may be $O(N^2)$. Clustering may be performed periodically, for example once a day, or based on other periods, or other triggers to start. However, the high computational power required for clustering according to the prior art may limit the number of analyzed interactions for a given computer infrastructure.

An interaction may be a conversation or exchange of information between two or more people, for example a speaker, e.g., a customer, person or fraudster on the one hand, and a call center agent or another person on the other hand. An interaction may be for example a telephone call or a voice over Internet Protocol (VoIP) call. An interaction may describe both the event of the conversation and also the data associated with that conversation, such as an audio recording of the conversation and metadata. Metadata describing an interaction may include information beyond the exchange itself: metadata may include for example the telephone number of the customer or fraudster (e.g. gathered via ANI, automatic number identification), an internet protocol (IP) address associated with equipment used by the speaker or fraudster, account information relevant to or discussed in the interaction, the purported name or identification (ID) of the person, audio information related to the interaction such as background noise, and other information.

Using voice biometrics technology for detecting fraudsters may include generating a voiceprint (also referred to as a voice signature) of a speaker part of an interaction. The voiceprint may be generated from the voice recording of the speaker part of the interaction (e.g., the part of the interaction not attributed to the agent of the call center) and may include features of the voice of the speaker. A voiceprint may be a spectrogram, or acoustic frequency spectrum of a voice, or a vector (an ordered series of numbers) or feature vector of, for example, 400 numbers, typically stored in digital form. The numbers in the vector may represent features of the person's voice. A voiceprint may be a vector (referred to as an i-vector) of voice biometric attributes. A voiceprint may be unique to a single person and may be used as an identification method, for example, by comparing or otherwise matching voiceprints. A match of two voiceprints indicating they are similar enough may indicate that both represent the same person. Voiceprints may be compared or matched using probabilistic linear discriminant analysis (PLDA) to compare voiceprints and generate a similarity score (a score indicative of the similarity between the voiceprints, referred to herein simply as score). Other embodiments may use neural networks (NN) such as deep neural networks (DNN) to compare voiceprints and generate a score. Other methods to compare voiceprints may be used.

Embodiments of the invention may provide systems and methods for clustering calls or interactions based on the speaker's voice. Clustering may group a set of objects, in this case the voiceprints, such that objects in the same group or cluster are more similar in some sense to each other than to those in other groups or clusters, thus, a cluster may be a group of events and data where a person with the same voice (thus the same person) engages in multiple interactions or telephone calls with one entity such as a call center (where the person associated with the call center, e.g., the agent is not considered to be the person with the same voice). A cluster may be detected by detecting the same voice, e.g., the voice of the same person (typically the same voice external to the call center), used across multiple interactions, as disclosed herein. A cluster may refer to both the real-world events (e.g., multiple interactions) and the data structure(s) representing such a cluster. A cluster may include or be identified by data such as a cluster ID (identification), the telephone numbers involved, a voiceprint, a cluster score (e.g., measuring the probability the identified cluster is in fact a cluster), etc.

Embodiments of the invention may provide systems and methods for clustering calls or interactions based on the speaker's voice that require a significantly smaller number of comparisons with respect to prior art. Embodiments of the invention may include an initial filtering or screening phase, in which pairs of similar speakers are detected based on comparing the voiceprint of the speakers to a set of voiceprints, referred to herein as benchmark voiceprints, and not to one another as in prior art.

According to embodiments of the invention, different speakers may have different distribution of similarities to other speakers. Some speakers may sound like many other speakers, some speakers may not sound like many other speakers, and some may sound like some speakers and not like other speakers. Embodiments of the invention may include comparing each voiceprint with each voiceprint of the benchmark voiceprints. A score indicative of the similarity between the compared voiceprints may be calculated. Thus, a plurality of scores may be calculated for each voiceprint, where each score is indicative of the similarity between the voiceprint and one of the benchmark voiceprints. According to embodiments of the invention, the distribution of scores (e.g., mean and standard deviation of the scores) may be unique to speakers, or unique enough to enable finding pairs of similar speakers, referred to herein as candidate pairs, and filtering out speakers with very different distributions. According to embodiments of the invention, the similarity of speakers in candidate pairs may be further verified to detect interactions of a single speaker, e.g., by comparing the voiceprints of the speakers in candidate pairs.

According to embodiments of the invention, filtering out (e.g., filtering to remove from the analysis) speakers with very different distributions may dramatically reduce the complexity of the clustering process of N voiceprints, for example, from ($O(N^2)$) to about ($O(N^{1.3})$), where K is the number of voiceprints in the benchmark and K<<N. The complexity of ($O(N^{1.3})$) was estimated by performing experiments on exemplary real world data, and may depend on actual data.

Therefore, embodiments of the invention may improve the technology of computerized fraud detection in call centers by dramatically reducing the complexity of interactions clustering and therefore enabling the same computing systems to support fraud detections of significantly more interactions comparing to prior art. According to embodiments of the invention, using 1.000-2.000 benchmark interactions may provide sufficient accuracy that is similar to the prior art. Thus, for screening 1-10 million or more interactions, the voiceprints of each of those interactions may be initially compared against a set of only 1,000-2,000 benchmark voiceprints. Less computing resources may be used compared with the prior art.

Figure 1:
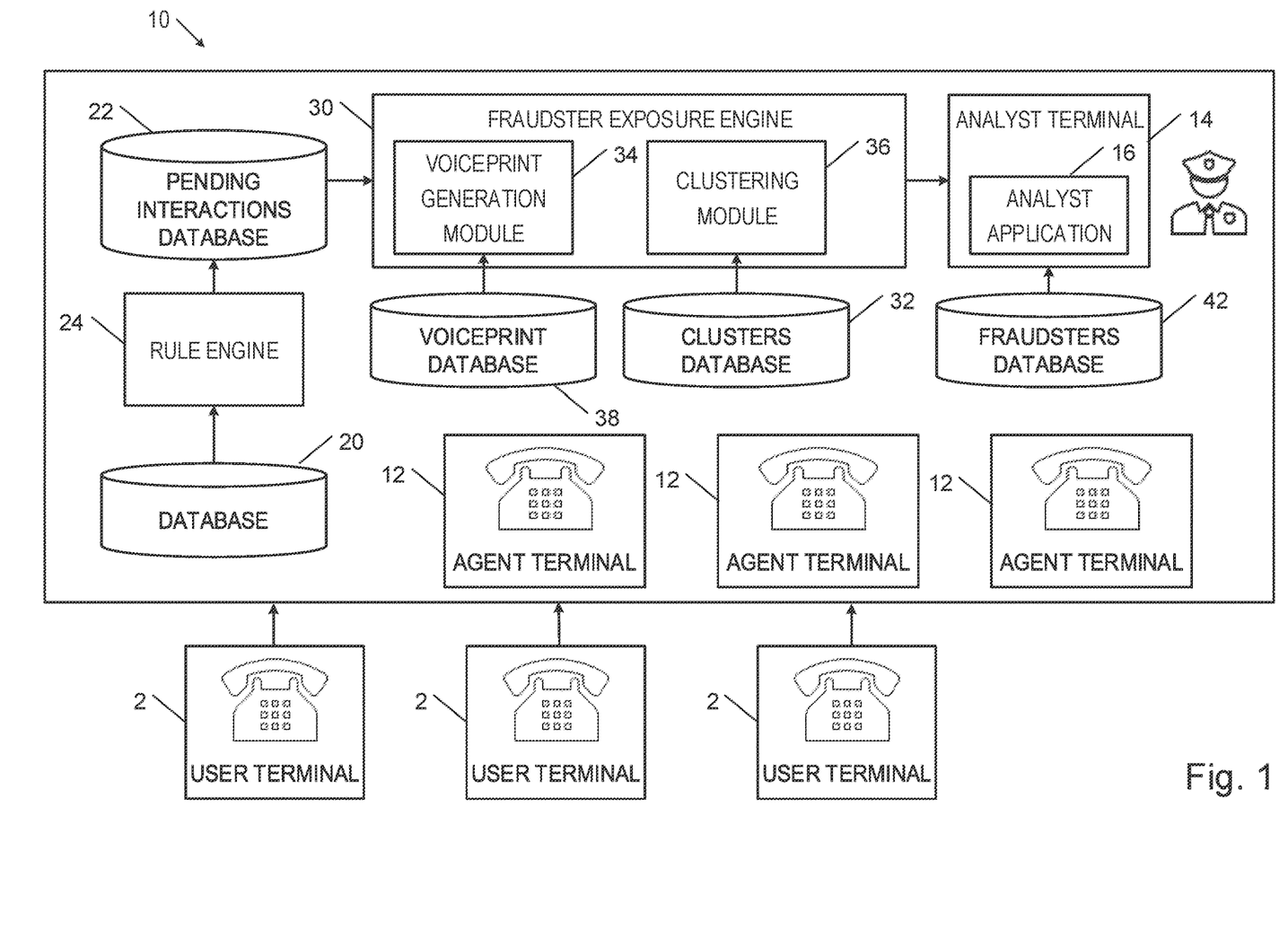
FIG. 1 depicts a call center and fraud analysis system, according to embodiments of the present invention.

FIG. 1 depicts a call center and fraud analysis system according to embodiments of the present invention. Call center 10 may include one or more agent terminals 12 used by agents to communicate with users, speakers (e.g., legitimate users and fraudsters, variously) operating user terminals 2 during interactions; and one or more analyst terminals 14, used by security officers, analysts, or other personnel to analyze data output by call center 10 and to input data or feedback, or control the process. Data such as interaction data (e.g., audio recordings and metadata) may be recorded and stored in database 20 and in other systems described.

Rule engine 24 may filter or flag interactions for fraud analysis, thus lowering the high volume of interactions that may be analyzed to detect fraudsters. Rule engine 24 may test interaction data against a set of rules to determine which interactions should be further analyzed. The set of rules may include various types of rules, such as the speaker got mismatch result during authentication procedure (e.g., the data that the user provides during authentication procedure does not match the authentication data that is saved in the organizations database), the speaker asked to perform a high-risk transaction, the agent that handled the interaction is associated to a special group that should always be monitored. e.g., VIP customers, etc. An interaction that matches one or more of the rules may be stored in pending interaction database 22 to be analyzed by proactive fraudsters exposure (PFE) engine 30, also termed fraudster exposure engine.

Pending interaction database 22 may store data describing interactions filtered or flagged for fraud analysis which are to be analyzed by PFE engine 30, which may expose fraudsters by clustering interactions by voice, and possibly other information such as account number. PFE engine 30 may retrieve and analyze interaction data. PFE engine 30 may read the information from pending interaction database 22 and create or generate a voiceprint or a voice signature for each interaction (to the speaker part in the interaction) to be stored in voiceprints database 38.

A single person identified by voice may have multiple interactions associated with that person clustered to a voice cluster. PFE engine 30 may collect the voiceprints of the interactions and perform a clustering algorithm on these voiceprints. The outcome of the procedure may be clusters of interactions of potential speakers stored for example in cluster database 32. Each cluster in clusters database 32 may be associated with a repeating speaker voice based on the generated voiceprints. Clustering may be performed periodically, for example once a day, or based on other periods, or other triggers to start. Clusters database 32 may store clusters of interactions determined to be from the same person, that are deemed to be relevant (e.g., where fraud is suspected, or risky transactions are involved). It has been shown that fraudsters tend to call the victim call center more than regular users. Therefore, clustering incoming interactions based on voice may aid in detecting fraudsters.

PFE engine 30 may cluster N interactions from interaction database 22 using voiceprints of the speaker part of the interactions stored in voiceprints database 38. According to embodiments of the invention. PFE engine 30 may cluster the N interactions by first finding pairs of interactions that pertain to or belong to a single cluster of interactions, and then grouping or clustering those pairs to clusters.

According to embodiments of the invention, PFE engine 30 may determine that a pair of interactions pertains or belongs to a single cluster of interactions in a two-phase process. The first phase may include finding candidate pairs of interactions and the second phase may include determining which of those candidate pairs pertain to the same cluster. In a preliminary screening phase, PFE engine 30 may compare the voiceprint associated with the speaker part in the interaction to each one of a set of K benchmark voiceprints. Comparing a voiceprint (e.g., of one of the N interactions) to another voiceprint (e.g., of one of the K benchmark voiceprints) may include calculating a score indicative of a similarity between the two voiceprints. For example, the score may be in the range of –50 to +50 where –50 may indicate that the two voiceprints are not similar at all, and +50 may indicate that the voiceprints are identical. Other scales may be used. Thus, PFE engine 30 may calculate a plurality of scores for each interaction, where each score is indicative of the similarity between the voiceprint of the speaker part of the interaction and one voiceprint of the set of benchmark voiceprints.

Having a plurality of scores for each interaction. PFE engine 30 may calculate, for each interaction, statistics of the scores. According to embodiments of the invention, PFE engine 30 may determine that a pair of interactions are similar, e.g., that the pair of interactions is a candidate pair, based on the statistics of the scores of each interaction in the pair.

In some embodiments, the set of K benchmark voiceprints may be selected from the N voiceprints of the N interactions, e.g., the set of K benchmark voiceprints may include voiceprints that are randomly selected from the N voiceprints of the N interactions. For example, during routine operation, a voiceprint may be generated for a bulk of N=1 to 10 million or more incoming interactions that may be analyzed according to embodiments of the invention. The voiceprints of the analyzed bulk of N incoming interactions may be stored in voiceprints database 38. A set of for example K=1,000 to 2,000 voiceprints may be selected (e.g., randomly) from the N voiceprints stored in voiceprints database 38 to be used as benchmark voiceprints. In some embodiments, the set of K benchmark voiceprints may be prepared in advance from other voiceprints.

Thus, PFE engine 30 may find candidate pairs of interactions based on similarity in the statistics of the scores of each interaction in the candidate pair. For example PFE engine 30 may find candidate pairs of interactions by calculating similarity between the statistics of the scores and selecting pairs for which the similarity is above a similarity threshold. In some embodiments, the statistics of the scores of the candidate pair may include means and standard deviations, and candidate pairs of interactions may include pairs of interactions for which the difference between the mean associated with each interaction is below a threshold (referred to as the mean threshold) and the difference between the standard deviation (STD) associated with each interaction is below a threshold (referred to as the STD threshold). Other criteria may be used. In some embodiments, for similarity scores in the range of −50 to +50, the mean threshold may be in the range of 3-5, and the STD threshold may be in the range of 1-2.

Figure 2A:
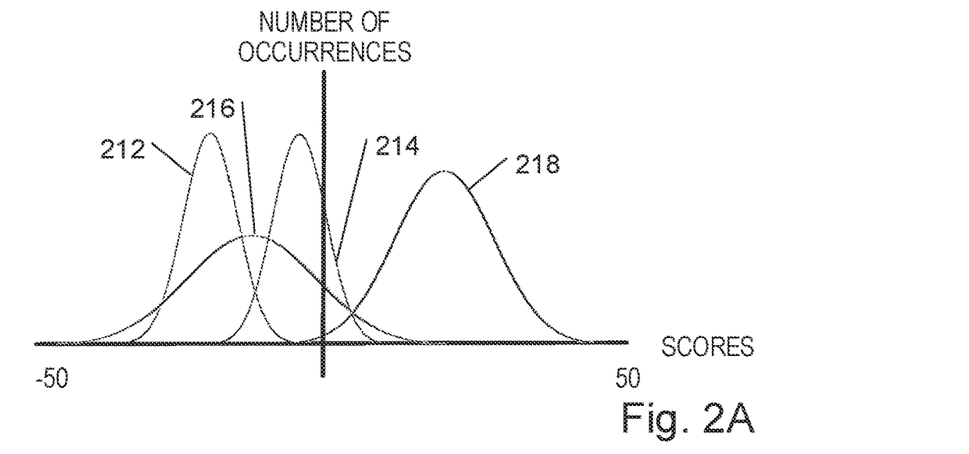
FIGS. 2A-C which present graphs of a number of occurrences of scores of exemplary interactions, according to embodiments of the invention.
Figure 2B:
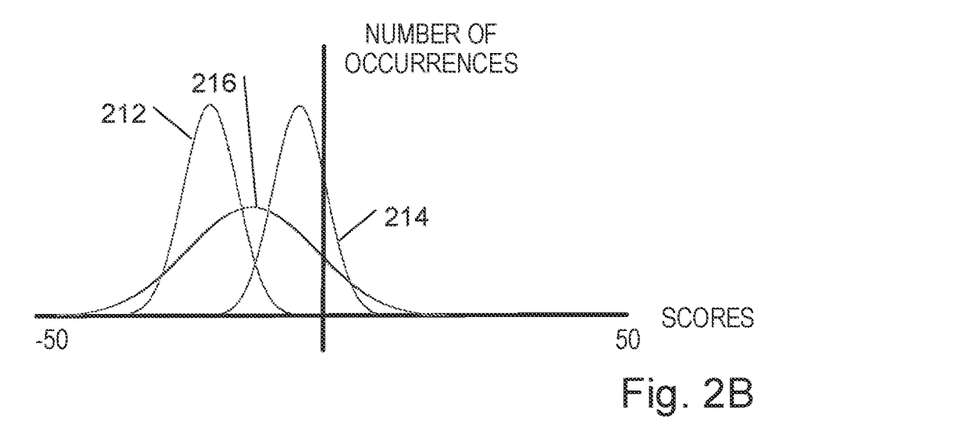
Figure 2C:
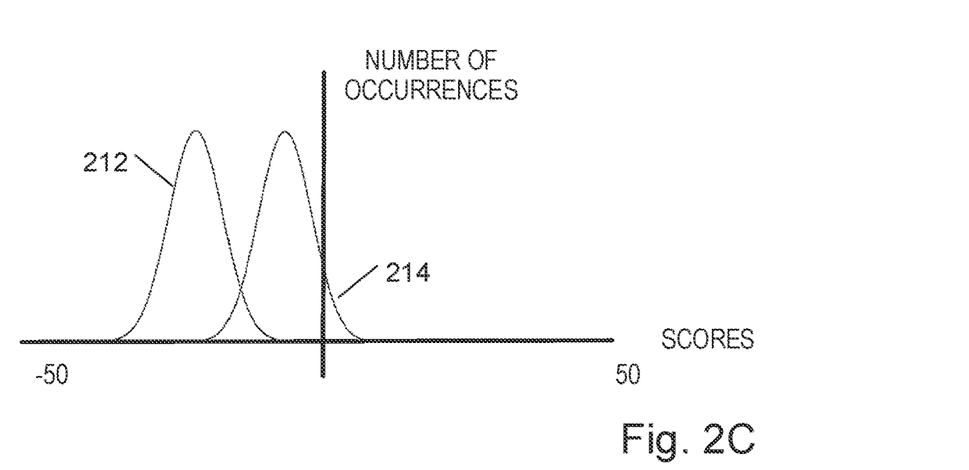

Reference is now made to FIGS. 2A-C which present graphs of a number of occurrences of scores of exemplary four interactions 212, 214, 216 and 218, according to embodiments of the invention. FIG. 2A presents the graphs of all four interactions 212, 214, 216 and 218. It can be seen in FIG. 2A that interaction 218 is generally similar to many of the benchmark voiceprints, while interaction 212 is generally not similar to many of the benchmark voiceprints. Therefore, according to embodiments of the invention, chances are high that each of interactions 212 and 218 includes different speaker. FIG. 2B presents the interactions for which the difference between the mean of each interaction is below the mean threshold. Interaction 218 was removed from FIG. 2B since the difference between the mean of interactions 212, 214, 216 and the mean of interaction 218 is above the mean threshold. FIG. 2C presents the interactions for which the difference between the mean of each interaction is below the mean threshold and the difference between the STD of each interaction is below the STD threshold. Interaction 216 was removed from FIG. 2C since the difference between the STD of interactions 212, 214 and the STD of interaction 216 is above the STD threshold. Thus, interactions 212 and 214 pass the screening phase and are considered a candidate pair.

According to some embodiments. PFE engine 30 may determine which of the candidate pairs pertain to the same cluster. e.g., which of the candidate pairs pertain to or includes the same speaker, by calculating a pair threshold and a pair score for each candidate pair and comparing the pair score with the pair threshold. The pair threshold Th may be calculated based on the statistics of the scores of the candidate pair. For example, the pair threshold may be a value that is above a majority of the scores of the interactions of the pair. For example, the pair threshold Th may equal the maximum between the mean plus Z times the standard deviation of the scores of each interaction of the candidate pair, wherein Z is a number equal or larger than two, e.g., 2.5, 3 or 4. For example, let X denote the scores of a first interaction in a candidate pair, and Y denote the scores of a second interaction in the candidate pair, thus the pair threshold Th may be calculated by:

$$Th(X,Y) = \max[(\text{mean}(X)+Z*STD(X), \text{mean}(Y)+Z*STD(Y)] \quad \text{(Equation 1)}$$

Other calculations may be used.

For calculating the pair score, PFE engine 30 may compare the voiceprints associated with the interactions of the pair, e.g., using the same method used for comparing voiceprints of interactions to benchmark voiceprints. The pair score may be indicative of a similarity between the voiceprints associated with the interactions of the pair. PFE engine 30 may determine that the pair pertain to a single cluster of interactions, e.g., that both interactions in the pair belong to the same cluster, if the pair score is above the pair threshold. Other criteria may be used.

According to embodiments of the invention, PFE engine 30 may cluster interactions based on the pairs that pertain to a single cluster. For example PFE engine 30 may traverse the pairs that pertain to a single cluster, and repeat the following for each pair:

if none of the interactions in the pair already pertain to or are members of a cluster, assign the interactions in the pair to a new cluster, e.g., the pair may form a new cluster that includes the two interactions of the pair (other interactions may be added to this cluster further in the clustering process), if a first interaction in the pair pertains to or is a member of a cluster and a second interaction in the pair does not pertain to a cluster, assign the second interaction to the same cluster as the first interaction, and if a first interaction in the pair pertains to or is member of a first cluster and a second interaction in the pair pertains to a second cluster, unify or combine the first cluster and the second cluster into a single cluster.

Comparing voiceprints is a computationally intensive process. According to prior art, in order to find clusters of interactions that include the same speaker, the voiceprint of each interaction has to be compared with each voiceprint of all other interactions. Thus, for a set of N interactions, $$\frac{N(N-1)}{2}$$

comparisons are required, and the complexity is $(O(N^2))$. It should be noted that in many call centers N may be in the range of 1-10 million of interactions, or more. According to embodiments of the invention, however, pairs of candidate interactions may be detected by comparing each voiceprint in the set of N interactions to only a reduced set of K benchmark voiceprints where K may be as little as 1000 voiceprints. Other sizes of sets may be used. Thus, the overall complexity of the clustering process may be reduced to $((O(N^{1.3}))$.

Once the interactions are clustered, the clusters of interactions including the same speaker may be stored in clusters database 32. A cluster in clusters database 32 may be represented as a matrix or a list of voiceprints. Other methods of defining, storing or representing a cluster may be used. According to some embodiments, the one or more clusters in clusters database 32 may be ranked and classified to yield a list of potential fraudsters, e.g., by analyst application 16 and/or by a security officer. In case it is determined that the interactions in a cluster have been made by an actual fraudster, the interactions and the respective fraudster information may be added, e.g., via the analyst application 16, to a fraudsters database 42. According to some embodiments, after the details of a fraudster are stored in the fraudsters database 42, when the same fraudster calls the customer service center, the fraudster may be detected (e.g., using voice recognition or other indications) in real-time. An alert may be sent to the users e.g., the agents and/or the security officers upon the detection, for further monitoring and analysis, or the call may be blocked alternatively.

Figure 3:
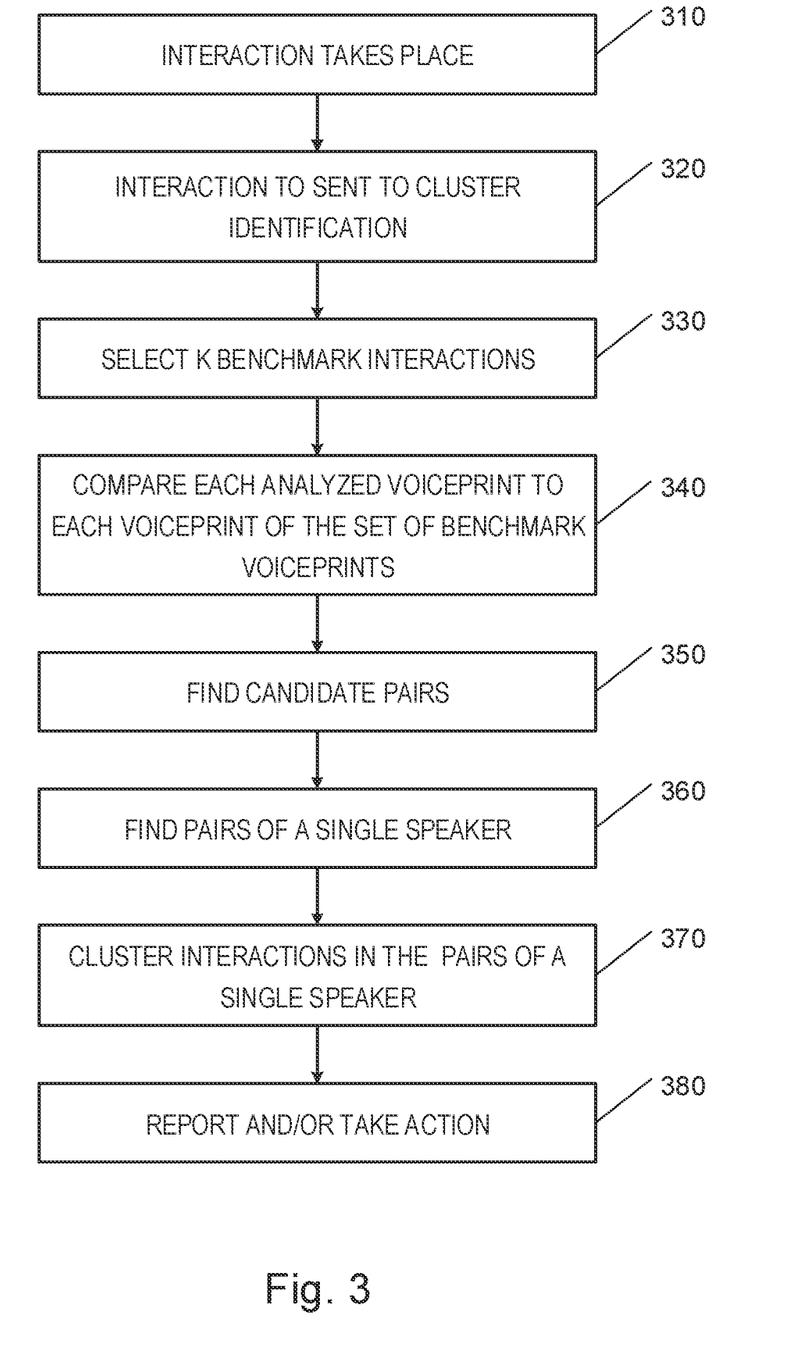
FIG. 3 shows a flowchart of a method, according to embodiments of the present invention.

FIG. 3 shows a flowchart of a method according to embodiments of the present invention. The operations of FIG. 3 may be performed by the systems described in FIGS. 1 and 4, but other systems may be used.

In operation 310, an interaction may take place; for example, a person (e.g., a speaker external to the organization) may engage in a telephone call with an agent at a call center (the agent typically internal to the organization, e.g., the call center) regarding a certain account. The interaction itself may be recorded (to provide an audio recording of the call), as well as data describing the interaction, such as metadata.

Only certain interactions, for example those corresponding to certain rules, may be input to cluster detection; in other embodiments all interactions may be input to a cluster detection process. Interactions or calls may first be collected and filtered or flagged to produce calls or interactions which are deemed to be high risk, significant, or otherwise relevant to a PFE process to determine or create clusters of interactions by the same speaker possibly involved in fraud or high-risk transactions.

Thus, in operation 320, in an identification or "tagging" phase, it may be determined if the interaction should be sent to a cluster identification process. A set of rules may have been defined (e.g., by a security officer) that describe which interactions should be sent for cluster analysis. Example rules include for example, that if any of the following occur, the interaction should go to cluster processing:
   a. If the speaker received a mismatch result during authentication, e.g., authentication failed because it was determined that the speaker was not who s/he said s/he was; and/or
   b. The speaker asked to perform a high-risk transaction; and/or
   c. The agent that handled the interaction is associated with special or "VIP" group that should always be monitored.

Other or different rules may be used. When an interaction or call ends, information of the interaction (e.g. voice data, metadata) may be sent to a calls or interaction collection engine which applies rules or other functionality to determine if the interaction matches to one or more pre-defined rules of the system. If the interaction matches one or more of the rules, the interaction may be stored in a pending interaction database 22 pending interaction database, waiting to be analyzed by a PFE engine 30.

In some embodiments, interactions or audio recordings may be analyzed to identify clusters or groups of such recording or interactions which are suspected of fraud or being associated with fraud, where each cluster includes or is associated with interactions or audio recordings, each interaction or audio recording associated with the same speaker (the speaker being other than an agent at a call center).

In operations 330-370 a computer processor such as processor executing or acting as a PFE engine 30 may analyze calls or interactions filtered or flagged and deemed to be highly relevant (e.g., stored in pending interaction database 22) to identify clusters of a single speaker. Clustering of interactions may include a two-phase process, including operations 350 and 360, of finding pairs of interactions of a single speaker and clustering the interactions in the pairs of interactions of a single speaker (operation 370). Clustering may be performed periodically, for example once a day, or based on other periods, or other triggers to start, and may include the interactions identified in operation 320.

In operation 330 K benchmark voiceprints may be obtained or selected. In some embodiments, K may be smaller than the number of analyzed voiceprints N such that K<<N. For example, N may be over a million and K may be in the range of 1.000-2.000. In some embodiments, the K benchmark voiceprints may be selected, e.g., randomly, from the plurality of N analyzed voiceprints, assuming that random selection may provide voiceprints of K different speakers. In some embodiments, the benchmark voiceprints may be prepared in advance to ensure that the K benchmark voiceprints include voiceprints of K different speakers.

In operation 340, PFE engine 30 may calculate, for each of N analyzed interactions, a plurality of scores, where each score may be indicative of a similarity between the voiceprint of the interaction and one voiceprint of the set of benchmark voiceprints. PFE engine 30 may compare or match each two voiceprints (e.g., one voiceprint of an analyzed interaction and one voiceprint of the set of benchmark voiceprints) using any applicable method that would provide a grade or a score that is indicative of the similarity between the two voiceprints. Thus, each interaction of the N analyzed interactions may have associated with it a plurality of scores, each indicative of a similarity between the voiceprint of the interaction and one voiceprint of a set of benchmark voiceprints.

In operation 350, PFE engine 30 may find candidate interactions or interactions of similar speakers, or having similar voiceprints which may identify the same speaker. Operation 350 may include an initial filtering or screening phase that is directed to efficiently filter out speakers with very different voices. In some embodiments, PFE engine 30 may find candidate pairs of interactions or pairs of interactions of similar speakers. According to embodiments of the invention, finding interactions of similar speakers may include comparing scores of the interactions. For example, PFE engine 30 may calculate, for each interaction, statistics of the scores and compare the interactions by comparing the statistics of the scores of the interactions. In some embodiments. PFE engine 30 may find groups or clusters of similar speakers by comparing the statistics of the scores. In some embodiments, PFE engine 30 may find pairs of similar speakers by comparing the statistics of the scores.

In some embodiments, to find candidate pairs of interactions, PFE engine 30 may calculate similarity between the statistics of the scores of each pair of analyzed interactions, and find pairs for which the similarity is above a similarity threshold. In some embodiments, to find candidate pairs of interactions, PFE engine 30 may calculate means and standard deviations of the scores for each of the analyzed interactions, and find candidate pairs of interactions by finding pairs of interactions for which the difference between the mean associated with each interaction is below a mean threshold, and the difference between the STD associated with each interaction is below an STD threshold.

In operation 360, PFE engine 30 may find, in the candidate pairs, pairs of a single speaker or pairs that pertain to a single cluster of interactions. In some embodiments, PFE engine 30 may find, in the candidate pairs, pairs of a single speaker by comparing the voiceprints of the intersections to each other and generating a similarity score. In some embodiments, the similarity score may be compared to a predetermined threshold. In some embodiments, a threshold may be calculated for each candidate pair. For example, PFE engine 30 may calculate a pair threshold and a pair score for each of the candidate pairs. In some embodiments the pair threshold may be calculated based on the statistics of the scores of the candidate pair, and the pair score may be indicative of the similarity between the voiceprints associated with the interactions of the pair. PFE engine 30 may determine that the pair pertain to a single cluster of interactions if the pair score is above the pair threshold. In some embodiments, the pair threshold may be calculated according to Equation 1, however other methods may be used. In some embodiments, the pair score may be calculated by comparing the voiceprints of the two interactions in the pair, using any applicable method (e.g., the same method used for comparing voiceprints in operation 340).

In operation 370, PFE engine 30 may cluster the interactions based on the pairs that pertain to a single cluster, e.g., the pairs identified in operation 360 as including the same speaker. In some embodiments, PFE engine 30 may cluster the interactions by traversing the pairs that pertain to a single cluster, and for each pair:

- if none of the interactions in the pair already pertain to a cluster, assigning the interactions in the pair to a new cluster,
- if a first interaction in the pair pertains to or is already assigned to a cluster and a second interaction in the pair does not pertain to a cluster, assigning the second interaction to the same cluster as the first interaction, and
- if a first interaction in the pair pertains to or is already assigned to a first cluster and a second interaction in the pair pertains to or is already assigned to a second cluster, unifying the first cluster and the second cluster into a single cluster.

In operation 380, a report may be generated and displayed to a user and/or action may be taken. Action may include embodiments automatically adding the fraudster (e.g., the speaker in the cluster), the fraudsters' voice, the fraudsters' voiceprint, or other information, to a watchlist, without a human intervention. In some embodiments, clusters may be presented to a security officer, e.g., via analyst terminal 14, and the security officer may add (or decide not to add) the fraudster to the watchlist.

In some embodiments, analyst terminal 14, may display to for example a security officer or another person who may review information described by the analysis and take action, for example determine if a detected or cluster should be accepted as-is (e.g., "approve"), or rejected (e.g., not be deemed to be related to a fraudster), rate or modify a relevance of a cluster, or other actions. A date when the suspected fraudster list was updated may be displayed. Widgets or controls may display information about the analyzed interactions, such as the interaction origin (e.g., the number the speaker called from), the number of interactions in the cluster, etc.

A display may include information on a cluster, each entry (e.g., row) for a cluster including details such a status (e.g., if a user approved the cluster as being relevant or not), a rank or relevance score (which may be a number. e.g., 0-1, or discrete categories such as high/medium/low or relevant/not relevant) and other data such as whether comments have been added. A user may indicate or double click on a displayed cluster to "drill down" and display an expanded view including for example, details of the fraudster in the cluster, a speaker ID (the ID of the claimed customer, or an ID generated for a suspected fraudster, used to track that suspected fraudster), the type of detected fraud behavior, the number of calls attributed to that fraudster (e.g. as part of the cluster, or calls detected outside the cluster), the frequency of a fraudster's activity, a status (e.g. the speaker was added to a watchlist), the rank or relevance (e.g. a PFE rank categorizing fraudsters by low, medium and high, typically relative to other suspected fraudsters), a type of fraud attempted by an individual, and comments if any. A cluster may be ranked for example based on how likely the cluster is indeed a cluster of the same person.

A security officer reviewing the presented fraud clusters may for example, approve the cluster (e.g., confirm it is actually a relevant fraud cluster), reject the cluster (e.g., correct that it is not a relevant cluster). The approved fraudsters may be added. e.g., automatically or by a security officer, to a real-time watchlist of fraudsters (e.g., such that if any approved fraudster contacts the contact center, an alert is presented or triggered in real time). Such a watchlist may be used automatically as part of fraudster detection on future calls or interactions.

Figure 4:
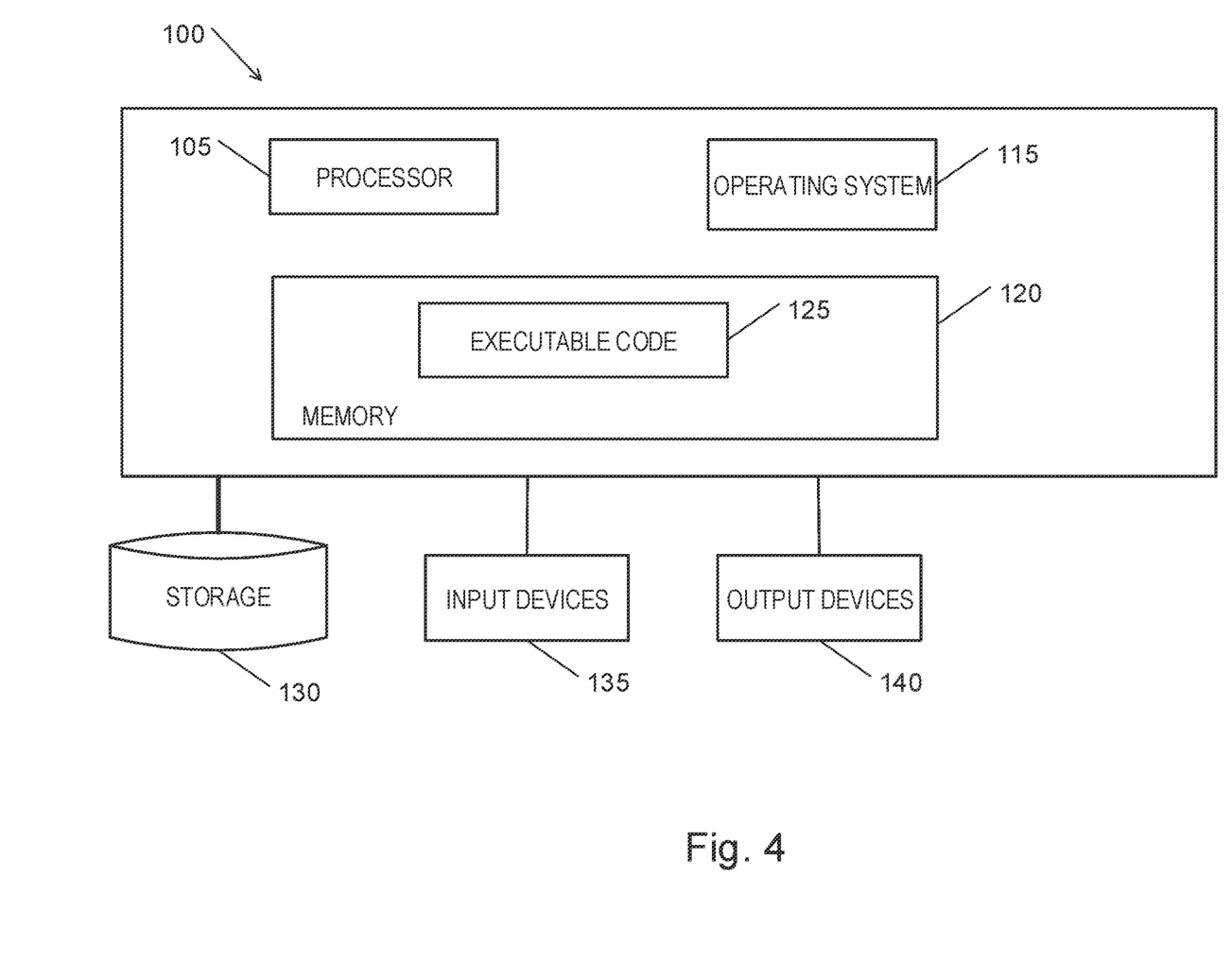
FIG. 4 shows a high-level block diagram of an exemplary computing device according to some embodiments of the present invention.

Reference is made to FIG. 4, showing a high-level block diagram of an exemplary computing device according to some embodiments of the present invention. Computing device 100 may include a processor 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Processor 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIG. 1 may be or include devices such as computing device 100, and one or more devices such as computing device 100 may carry out functions such as those described in FIG. 3. For example, rule engine 24, PFE engine 30 and agent terminals 12 analyst terminal 14, and other terminals may be implemented on or executed by a computing device 100.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by processor 105 possibly under control of operating system 115. For example, executable code 125 may configure processor 105 to perform clustering of interactions, to handle or record interactions or calls, and perform other methods as described herein. Although, for the sake of clarity, a single item of executable code 125 is shown in FIG. 7, a system according to some embodiments of the invention may include a plurality of executable code segments similar to executable code 125 that may be loaded into memory 120 and cause processor 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as interactions, metadata, biometric system samples, parameters or thresholds may be stored in storage system 130 and may be loaded from storage system 130 into memory 120 where it may be processed by processor 105. Some of the components shown in FIG. 7 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, a smartphone or any other suitable computing device. A system as described herein may include one or more devices such as computing device 100.

When discussed herein, "a" computer processor performing functions may mean one computer processor performing the functions or multiple computer processors or modules performing the functions; for example a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for classifying a plurality of interactions, the method comprising, using a processor:
   flagging one or more of the plurality of interactions based on one or more rules, wherein one or more of the rules describes an agent to be monitored;
   obtaining a plurality of voiceprints of the plurality of flagged interactions including a set of benchmark voiceprints, wherein each voiceprint of the plurality of voiceprints represents a speaker participating in an interaction of the plurality of flagged interactions, and wherein the benchmark voiceprints are selected from one or more of the plurality of the voiceprints including a plurality of different speakers;
   calculating, for each interaction of the plurality of flagged interactions, a plurality of scores, wherein each score of the plurality of scores is indicative of a similarity between the voiceprint of the interaction and one voiceprint of a set of benchmark voiceprints;
   calculating, for each interaction of the plurality of flagged interactions, statistics of the scores;
   finding candidate pairs of interactions based on similarity in the statistics of the scores of each interaction in the candidate pair;
   for each candidate pair:
      calculating a pair threshold, based on the statistics of the scores of the candidate pair;
      calculating a pair score indicative of a similarity between the voiceprints associated with the interactions of the pair; and
      determining that the pair pertains to a single cluster of interactions if the pair score is above the pair threshold; and
   clustering one or more of the interactions of the plurality of flagged interactions into a single cluster based on one or more of the pairs that pertain to a single cluster.

2. The method of claim 1, wherein the benchmark voiceprints are randomly selected from the plurality of voiceprints.

3. The method of claim 1, wherein finding the candidate pairs of interactions comprises:
   calculating similarity between the statistics of the scores; and
   finding pairs for which the similarity is above a similarity threshold.

4. The method of claim 1, wherein calculating statistics of the scores comprises calculating means and standard deviations, and wherein finding the candidate pairs of interactions comprises:
   finding pairs of interactions for which the difference between the mean associated with each interaction is below a second threshold and the difference between the standard deviation associated with each interaction is below a third threshold.

5. The method of claim 1, wherein calculating the pair threshold comprises:
finding, based on the statistics of the scores of the candidate pair, a value that is above a majority of the scores of the interactions of the pair.

6. The method of claim 1, wherein calculating the pair threshold comprises:
finding the maximum between the mean plus Z times the standard deviation of the scores of each interaction of the pair, wherein Z is a number equal or larger than two.

7. The method of claim 1, comprising:
clustering the interactions based on the pair that pertain to a single cluster by traversing the pairs that pertain to a single cluster; and for each pair:
if none of the interactions in the pair already pertain to a cluster, assigning the interactions in the pair to a new cluster;
if a first interaction in the pair pertains to a cluster and a second interaction in the pair does not pertain to a cluster, assigning the second interaction to the same cluster as the first interaction; and
if a first interaction in the pair pertains to a first cluster and a second interaction in the pair pertains to a second cluster, unifying the first cluster and the second cluster into a single cluster.

8. The method of claim 1, wherein calculating statistics of the scores comprises calculating means and standard deviations.

9. The method of claim 1, comprising filtering out one or more interactions from the detecting of pairs of similar speakers based on the statistics of the scores.

10. The method of claim 1, comprising displaying information on the cluster, the information comprising a rank, the rank based on a likelihood that the cluster describes a single speaker.

11. A system for classifying a plurality of interactions, the system comprising:
a memory; and
a processor configured to:
flag one or more of the plurality of interactions based on one or more rules, wherein one or more of the rules describes an agent to be monitored;
obtain a plurality of voiceprints of the plurality of flagged interactions including a set of benchmark voiceprints, wherein each voiceprint of the plurality of voiceprints represents a speaker participating in an interaction of the plurality of flagged interactions, and wherein the benchmark voiceprints are selected from one or more of the plurality of the voiceprints including a plurality of different speakers;
calculate, for each interaction of the plurality of flagged interactions, a plurality of scores, wherein each score of the plurality of scores is indicative of a similarity between the voiceprint of the interaction and one voiceprint of a set of benchmark voiceprints;
calculate, for each interaction of the plurality of flagged interactions, statistics of the scores;
find candidate pairs of interactions based on similarity in the statistics of the scores of each interaction in the candidate pair;
for each candidate pair:
calculate a pair threshold, based on the statistics of the scores of the candidate pair;
calculate a pair score indicative of a similarity between the voiceprints associated with the interactions of the pair; and
determine that the pair pertains to a single cluster of interactions if the pair score is above the pair threshold; and
cluster one or more of the interactions of the plurality of flagged interactions into a single cluster based on one or more of the pairs that pertain to a single cluster.

12. The system of claim 11, wherein the processor is configured to select the benchmark voiceprints randomly from the plurality of voiceprints.

13. The system of claim 11, wherein the processor conlguired to find the candidate pairs of interactions by:
calculating similarity between the statistics of the scores; and
finding pairs for which the similarity is above a similarity threshold.

14. The system of claim 11, wherein the processor configured to calculate statistics of the scores by calculating means and standard deviations, and to find the candidate pairs of interactions by:
finding pairs of interactions for which the difference between the mean associated with each interaction is below a second threshold and the difference between the standard deviation associated with each interaction is below a third threshold.

15. The system of claim 11, wherein the processor configured to calculate the pair threshold by:
finding, based on the statistics of the scores of the candidate pair, a value that is above a majority of the scores of the interactions of the pair.

16. The system of claim 11, wherein the processor configured to calculate the pair threshold by:
finding the maximum between the mean plus Z times the standard deviation of the scores of each interaction of the pair, wherein Z is a number equal or larger than two.

17. The system of claim 11, the processor configured to:
cluster the interactions based on the pair that pertain to a single cluster by traversing the pairs that pertain to a single cluster; and for each pair:
if none of the interactions in the pair already pertain to a cluster, assign the interactions in the pair to a new cluster;
if a first interaction in the pair pertains to a cluster and a second interaction in the pair does not pertain to a cluster, assign the second interaction to the same cluster as the first interaction; and
if a first interaction in the pair pertains to a first cluster and a second interaction in the pair pertains to a second cluster, unify the first cluster and the second cluster into a single cluster.

18. The system of claim 11, wherein the processor configured to calculate statistics of the scores by calculating means and standard deviations.

* * * * *